United States Patent [19]

Merle et al.

[11] Patent Number: 5,520,348
[45] Date of Patent: May 28, 1996

[54] APPARATUS FOR DETACHING AND REATTACHING A PHOTOGRAPHIC FILM TO A FILM CARTRIDGE

[75] Inventors: Thomas C. Merle; Dale W. Ryan, both of Rochester, N.Y.

[73] Assignee: Eastman Kodak Company, Rochester, N.Y.

[21] Appl. No.: 336,603

[22] Filed: Nov. 9, 1994

[51] Int. Cl.$^6$ ................................................ G03B 23/02
[52] U.S. Cl. .................................................. 242/348.1
[58] Field of Search ............................. 242/332, 332.4, 242/332.7, 348, 348.1, 348.3, 532.4, 532.7, 562, 562.1

[56] References Cited

U.S. PATENT DOCUMENTS

| | | |
|---|---|---|
| 3,586,258 | 6/1971 | Horlezeder . |
| 3,802,646 | 4/1974 | Nagel et al. ........................... 226/91 |
| 4,074,870 | 2/1978 | Kaufman . |
| 4,113,192 | 9/1978 | Osanai ................................... 226/92 |
| 5,031,852 | 7/1991 | Dowling et al. . |
| 5,093,686 | 3/1992 | Shigaki ................................... 355/77 |
| 5,215,273 | 6/1993 | Greene . |
| 5,439,186 | 8/1995 | Merle et al. ..................... 242/348.1 |

FOREIGN PATENT DOCUMENTS

| | | |
|---|---|---|
| 0548654A1 | 6/1993 | European Pat. Off. . |
| 0582852A1 | 2/1994 | European Pat. Off. . |
| 4-122925 | 4/1992 | Japan . |

*Primary Examiner*—John P. Darling
*Attorney, Agent, or Firm*—Frank Pincelli

[57] ABSTRACT

An apparatus and method for detaching and reattaching a filmstrip from a film cartridge. The film cartridge includes a spool rotatably mounted therein around which is wound a photosensitive filmstrip and an opening through which the filmstrip may pass for allowing the filmstrip to be removed from or returned to the film cartridge. The filmstrip has a leading edge and a trailing edge, the trailing edge of the filmstrip being detachably secured to the spool. The mechanism comprising a holder for holding the cartridge in a predetermined axial position; a guide for providing a single film guide path along which the filmstrip is guided when the filmstrip is being removed from or being returned to the film cartridge; a detach tool movable along a first tool path such that the tool can be inserted into the film cartridge such that the trailing edge of the filmstrip may be detached from the spool; and a reattach tool movable along a second tool path different from the first path so as to allow the tool to engage the trailing edge of a filmstrip being returned to the film cartridge along the second guide path. The detach tool, reattach tool, and guide are in axial alignment with respect to the filmstrip disposed in the cartridge.

11 Claims, 8 Drawing Sheets

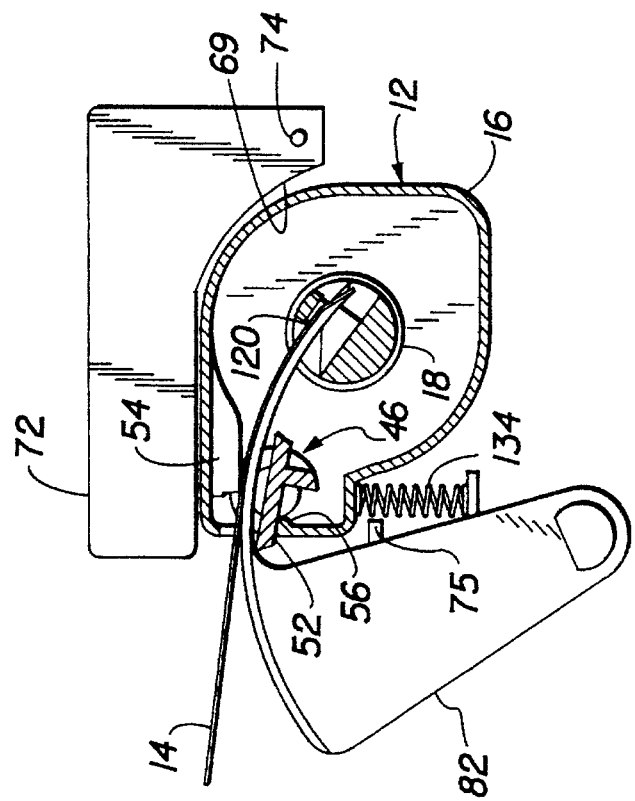
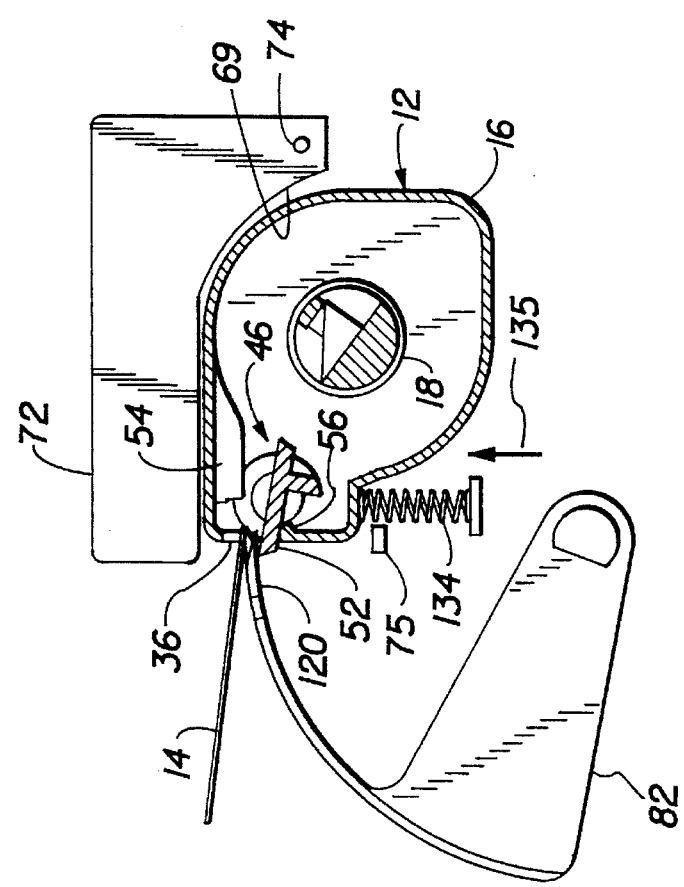

APPARATUS FOR DETACHING AND REATTACHING A PHOTOGRAPHIC FILM TO A FILM CARTRIDGE

FIELD OF THE INVENTION

The present invention is directed to an apparatus for detaching a filmstrip from a film cartridge so that the filmstrip can be subjected to a photofinishing operation and then reattaching the filmstrip to the same or different cartridge.

BACKGROUND OF THE INVENTION

There is disclosed in copending applications U.S. Ser. No. 08/172,006, filed Dec. 22, 1993, by Thomas C. Merle, Dale W. Ryan, and David L. Rowden, entitled TOOL FOR FILMSTRIP ATTACHMENT OR DETACHMENT, and U.S. Ser. No. 08/098,112, filed Jul. 27, 1993, by Thomas C. Merle, Dale W. Ryan, and David L. Rowden, entitled A TOOL AND METHOD FOR DETACHING A TRAILING END PORTION OF A FILMSTRIP FROM AT LEAST ONE HOOK ATOP A RAMP ON A FILM SPOOL INSIDE A FILM CARTRIDGE, separate devices for detaching and attaching a filmstrip to a film cartridge. These devices require separate space in order to accomplish each of these functions. Additionally these separate devices require the cartridge to be moved from one location to another, thus requiring additional winding and unwinding of the film at each separate workstation and labor and time in moving the cartridge from one location to the other.

The present invention provides a single apparatus that can easily detach and reattach a filmstrip at a single location without requiring movement of the cartridge or requiring unnecessary unwinding and rewinding of the film. Additionally, the device is designed to provide efficient utilization of existing space and minimize the cost of equipment necessary for detaching and reattaching the filmstrip.

SUMMARY OF THE INVENTION

In one aspect of the present invention there is provided a mechanism for detaching and reattaching a filmstrip from a film cartridge. The film cartridge includes a spool rotatably mounted therein around which is wound a photosensitive filmstrip and an opening through which the filmstrip may pass for allowing the filmstrip to be removed from or returned to the film cartridge. The filmstrip has a leading edge and a trailing edge, the trailing edge of the filmstrip being detachably secured to the spool. The mechanism comprises a holding means for holding the cartridge in a predetermined axial position; a guide for providing a single film guide path along which the filmstrip is guided when the filmstrip is being removed from or being returned to the film cartridge; a detach tool movable along a first tool path such that the tool can be inserted into the film cartridge such that the trailing edge of the filmstrip may be detached from the spool; and a reattach tool movable along a second tool path different from the first path so as to allow the tool to engage the trailing edge of a filmstrip being returned to the film cartridge along the second guide path. The detach tool, reattach tool, and guide are in axial alignment with respect to the filmstrip disposed in the cartridge.

In another aspect of the present invention there is provided a method for attaching and detaching a filmstrip from a film cartridge along a single film path, comprising the steps of:

providing a detach tool for detaching the trailing end portion of the filmstrip from the cartridge, moving the tool along a first tool path below the film path for detaching the trailing end portion, providing a reattach tool, for reattaching the trailing end portion to the film cartridge, moving the reattach tool along a second tool path different from the first tool path for reattaching the trailing end portion to the cartridge.

DETAILED DESCRIPTION OF THE DRAWINGS

FIG. 4 is a partial cross-sectional view of the reattach mechanism similar to FIG. 2 illustrating the reattachment tool in position for reattachment of the filmstrip to the film cartridge;

FIG. 5 is similar to FIG. 4 illustrating the reattach tool engaging the filmstrip with the spool of the cartridge;

DETAILED DESCRIPTION OF THE INVENTION

Figure 6:
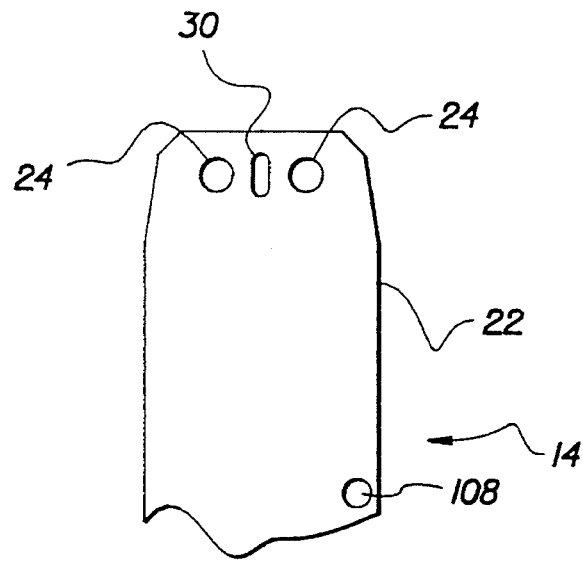
FIG. 6 is a top plan view of the trailing end portion of the filmstrip used with the film cartridge of FIG. 2.

Referring to the drawings, there is illustrated an apparatus 10 made in accordance with the present invention for detaching and reattaching a filmstrip 14 contained within a film cartridge 12. The film cartridge 12 comprises a cartridge shell 16 and a spool 18 rotatably mounted to the shell 16. The cartridge 12 may be designed to hold any size filmstrip, for example, 35 mm. However, the cartridge 12 may be designed to contain any size film. The spool 18 is rotatable about an axis X—X and filmstrip winding and unwinding directions U and W inside the cassette shell 16. In the embodiment illustrated, the cartridge 12 is of the thrust type, such as disclosed in U.S. Pat. Nos. 5,031,852 and 5,215,273, which are hereby incorporated by reference. A roll of photosensitive filmstrip 14 is coiled about the spool 18 to form successive convolutions of the filmstrip 14. The filmstrip 14 includes an inner or trailing end portion 22 (see FIG. 6), which is detachably secured to the spool 18. In the particular embodiment illustrated, the trailing end portion 22 is provided with a pair of openings 24, which are designed to engage a pair of projections 26 formed in the hub 28 of the spool 18. The trailing end portion 22 is further provided with a drive opening 30 which, in the particular embodiment illustrated, is designed to engage reattach tool 82 as is discussed in detail hereinafter.

The cartridge 12 is provided with an opening/slot 36 for allowing the filmstrip 14 to be removed from or returned to the cartridge 12. In the particular embodiment illustrated, the opening 36 has a substantially rectangular configuration having a top edge 38 and a bottom edge 40 which are substantially coplanar to the top and bottom surfaces of the filmstrip 14 and a pair of oppositely disposed side edges 42,44. The particular height H and width W of the opening 36 is selected in accordance with the needs of the cartridge and filmstrip.

A light valve/door 46 is provided which extends across the opening 36. The light valve 46, when in the closed position, prevents ambient light from entering the cartridge 12 through opening 36, and when in the open position, allows filmstrip 14 to either be inserted into or removed from the cartridge 12. In the particular embodiment illustrated, the light valve 46 comprises a rotatable shaft 48 having a pair of ends 49 rotatably mounted to the side walls 50 of the shell 16. The shaft 48 includes a ledge section 52 configured such that when in the closed position, the ledge section 52 will abut against stop 54 provided on the interior of the shell 16 adjacent the opening 36. A projection 56 is provided below the bottom edge 40 to assist in preventing any ambient light from passing into the cartridge 12. The shaft 48 and ledge section 52 are configured such that when the light valve 46 is in the open position, as illustrated in FIGS. 4 and 5, sufficient clearance is provided for allowing egress or ingress of the filmstrip 14. At least one end 49 of the shaft 48 extends through the shell 16 so that a drive tool 51 can engage core end 49 for moving the light valve 46 between the open and close positions. It is to be understood that the present invention is not limited to the particular light valve/door disclosed, and that various other light valves may be used.

Figure 7:
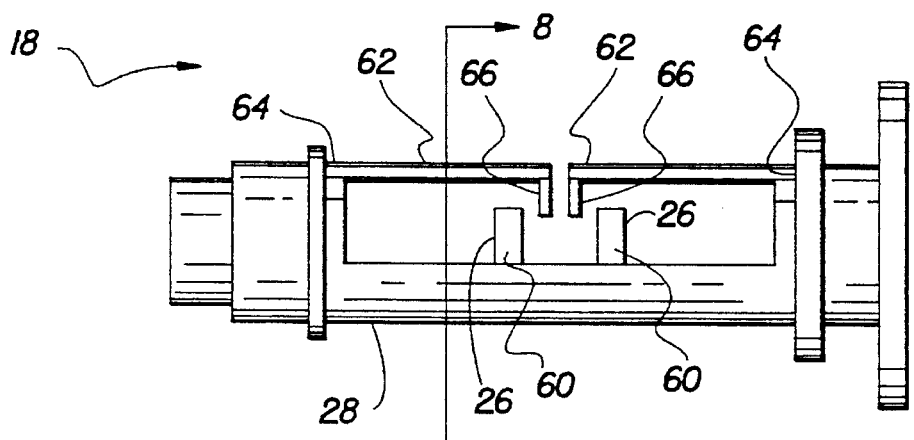
FIG. 7 is an elevational view of the spool of the film cartridge of FIG. 2.
Figure 8:
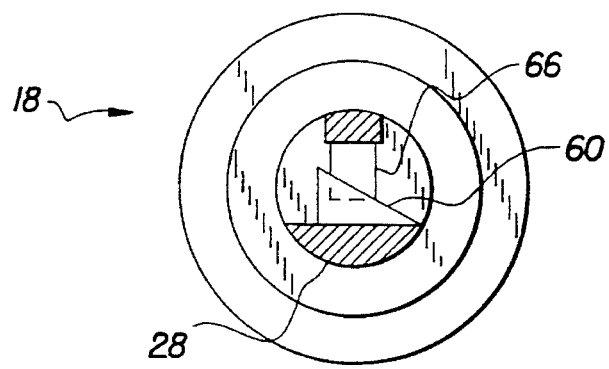
FIG. 8 is a cross-sectional view of the spool of FIG. 7 as taken along line 8—8.

Referring to FIGS. 7 and 8, there is illustrated an enlarged view of the spool 18 of cartridge 12. The spool 18 includes a pair of spaced projections 26 disposed in the central area of the hub 28, and are positioned so as to engage openings 24 in the trailing end portion 22 of the filmstrip 14. Preferably, as illustrated, projections 26 are each provided with an incline surface 60, which assists in the reattachment of the filmstrip 14 as discussed later herein. The spool 18 is also provided with a pair of flexible retaining members 62 which extend from each of the lateral ends 64 of the spool 18 and terminate in a pair of downwardly extending contact members 66. The flexible members 62 assist in retaining the trailing end portion 22 of the filmstrip 14 on the spool 18 once projections 26 have engaged openings 24.

Figure 1:
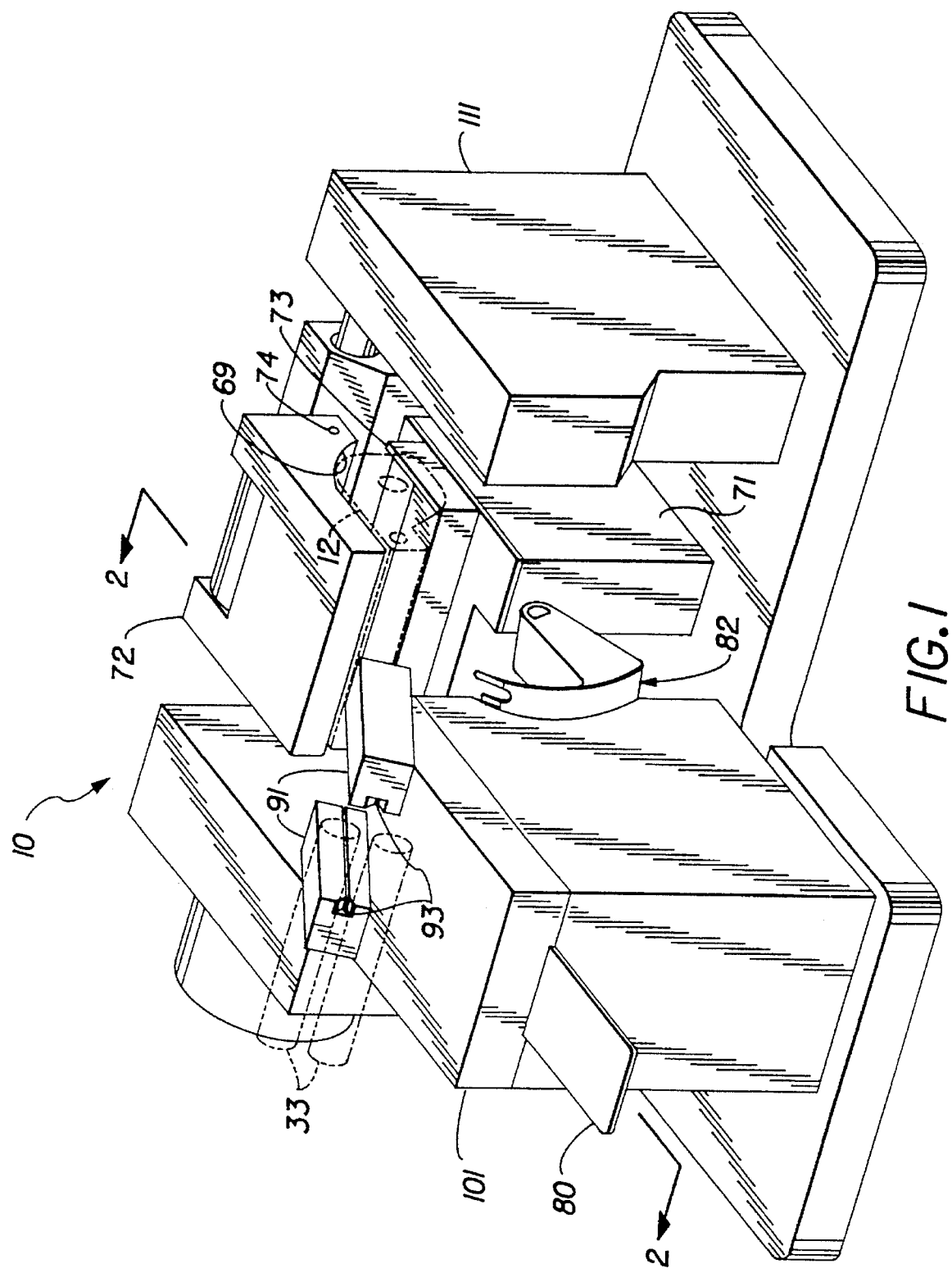
FIG. 1 is a perspective view of an apparatus made in accordance with the present invention.
Figure 2:
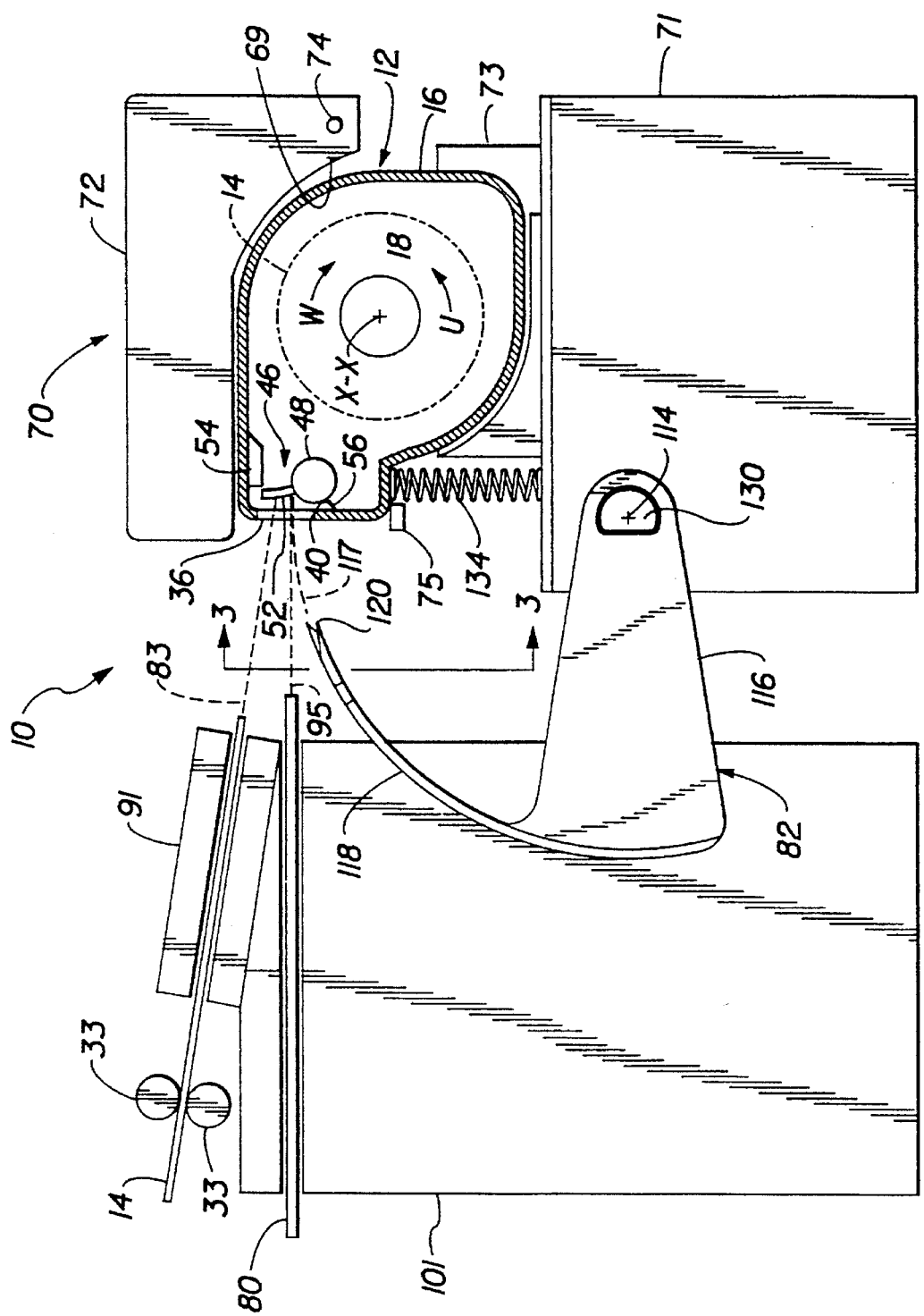
FIG. 2 is an enlarged partial cross-sectional view as taken along line 2—2 of FIG. 1 illustrating the relative position of the detach and reattach tools.
Figure 3:
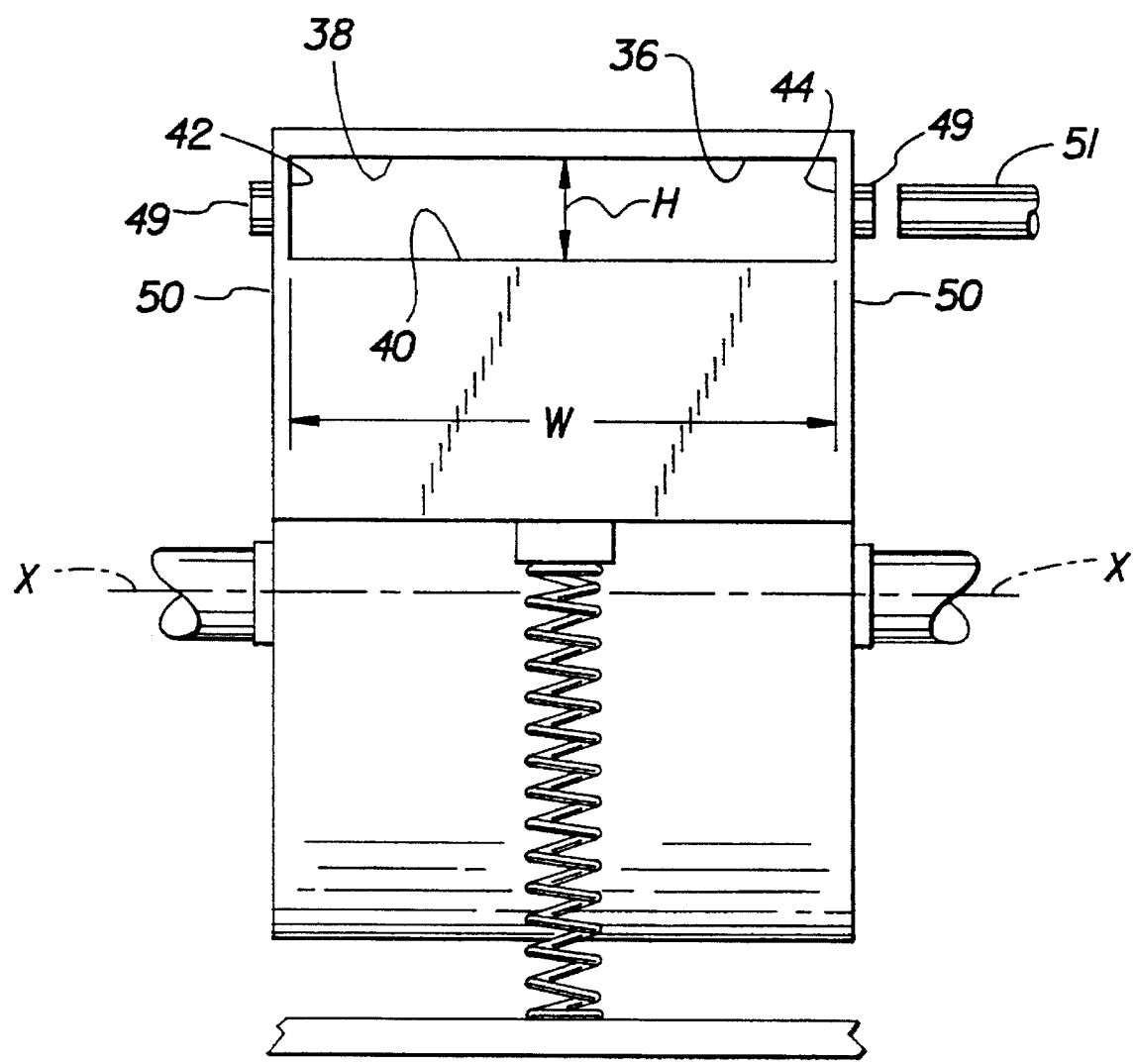
FIG. 3 is a front elevational view as taken along line 3—3 of FIG. 2 of a film cartridge located at the operational position of the apparatus.

Referring back to FIG. 2, a mechanism 70 is provided for holding and positioning the cartridge 12. The mechanism 70 includes a support member 71, a hold down arm 72 secured to support member 71, and a pair of sides 73 secured for member 71. The arm 72, support member 71, and sides 73 (only one of which is shown) form receiving pocket 69 for holding and retaining film cartridge 12 (shown in dash lines). The sides 73 axially constrain cartridge 12 so that appropriate drive mechanism can be connected to light valve 46 and spool 18 for moving these parts. The arm 72 may be moved between a first engaging position as shown in FIG. 2 and a non-engaging position as illustrated in FIGS. 4 and 5. Any desired technology may be used to move arm 72 between these two positions. In the embodiment illustrated, arm 72 is moved by a rotary solenoid (not shown) which rotates around about pivot 74. When the arm 72 is in the first engaging position, the arm 72 presses against a portion of the cartridge 12 so that the cartridge 12 is pushed against light valve shaft 48 and drive tool 51 so as to position the cartridge 12 in a first orientation as illustrated in FIG. 2. Alternatively, cartridge 12 can be pushed against a step member 75 so as to position the cartridge 12 in a first orientation.

The apparatus 10 is provided with a detach tool 80 for detaching the trailing end portion 22 of the filmstrip 14 from the cartridge 12 and a reattach tool 82 for reattaching the trailing end portion 22 to the spool 18 of the film cartridge 12 so that the filmstrip 14 can be wound back into the cartridge 12. As can be seen, apparatus 10 provides a single holding means for holding the cartridge in a predetermined axial position. In this position, the filmstrip 14 can be detached from or reattached to the film cartridge. There is no need or requirement that the cartridge 14 be placed at a first location for detaching and in a second location for reattaching of the filmstrip. Thus, allowing the filmstrip to be completely removed from the cartridge, conducting an appropriate photofinishing operation to the filmstrip, and then returning the filmstrip to the cartridge 12 without any further need for manipulation of the cartridge 12. In order to accomplish this, the detach and reattach tools 80,82 are designed and positioned such that the filmstrip 14 can be removed from the cartridge and returned to the cartridge along substantially a single path 83 (indicated by dash lines in FIG. 2). A film guide is provided for guiding the filmstrip 14 to and from the cartridge. In the embodiment illustrated, the film guide comprises a pair of guide members 91 secured atop support member 101. Each guide member 91 having a guide slot 93 for receiving one of the lateral edges of the filmstrip 14. A pair of pinch rollers 33 are used to drive the film from the cartridge 12 to a workstation where a photofinishing operation may be performed on the film and return the film to the cartridge when the operation is completed, and then returning the filmstrip to the cartridge.

Figure 10:
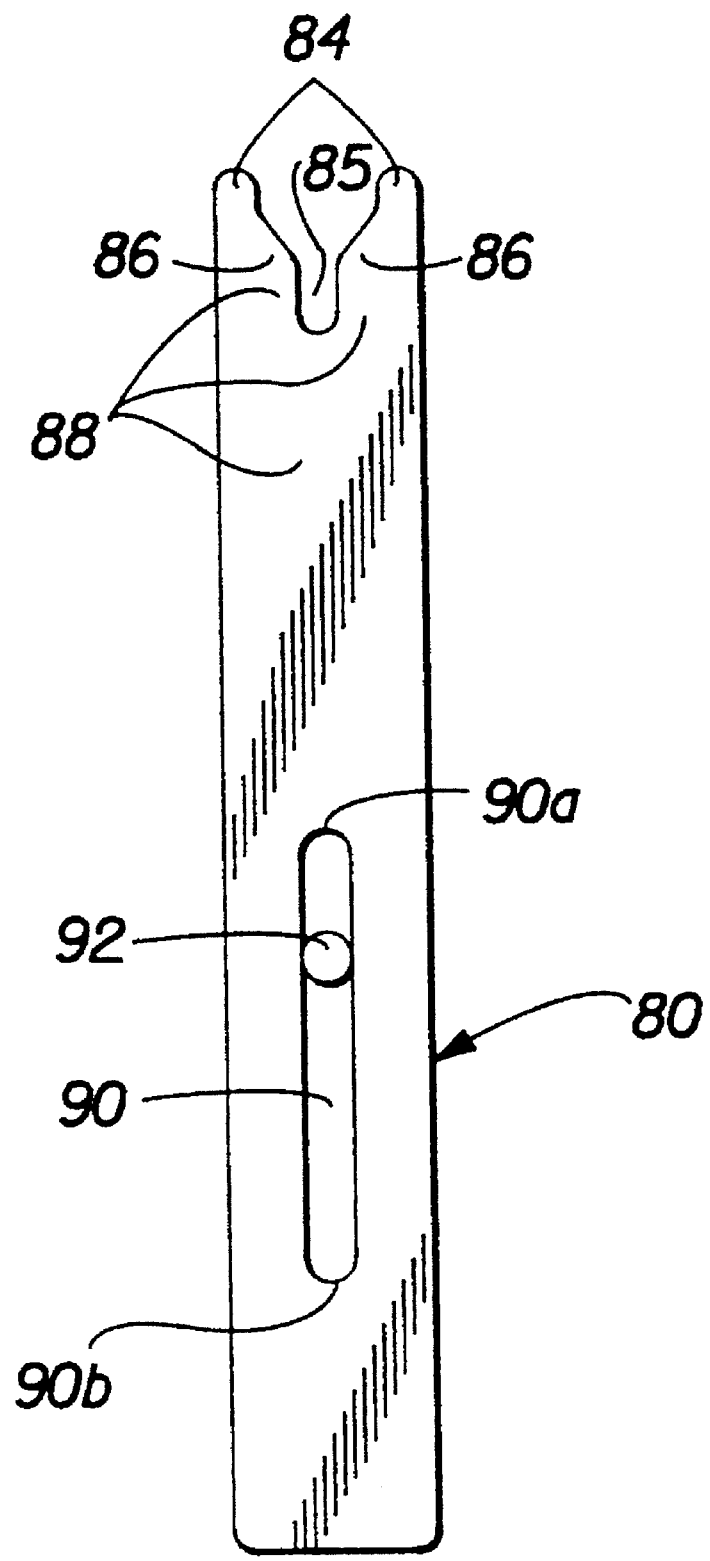
FIG. 10 is a top plan view of a tool for detaching the trailing end of a filmstrip of the film cartridge of FIG. 2.

In the embodiment illustrated, detach tool 80 is a flexible element, preferably made of a material such as plastic. As best seen by reference to FIG. 10, the tool 80 includes leading portions 84 followed by respective guide end portions 86. Preferably, the reading first portions 84 are rounded to facilitate insertion of the detach tool 80 into the film cartridge 12. The second end portions 86 are followed by third portions 88, which extend from the second portions 86. Preferably, the second portions 86 are each tapered from the third portions 88 to the first portion 84.

The third portion 88 defines a slot 85 which extends from an end of the second portion 86 into the third portion 88. The third portion 88 also defines an aperture/slot 90 which extends lengthwise along the third portion. A pin 92 extends into the slot 90 as movable along the length of the slot 90 so as to move the tool 80 (along a first tool path 95) into and out of the film cartridge 12. Further details as to the operation and use of the tool may be found in copending patent application Ser. No. 08/098,112, filed Jul. 27, 1993, by Thomas C. Merle, Dale W. Ryan, and David L. Rowden, entitled A TOOL AND METHOD FOR DETACHING A TRAILING END PORTION OF A FILMSTRIP FROM AT LEAST ONE HOOK ATOP A RAMP ON A FILM SPOOL, which is hereby incorporated by reference herein.

Figure 11:
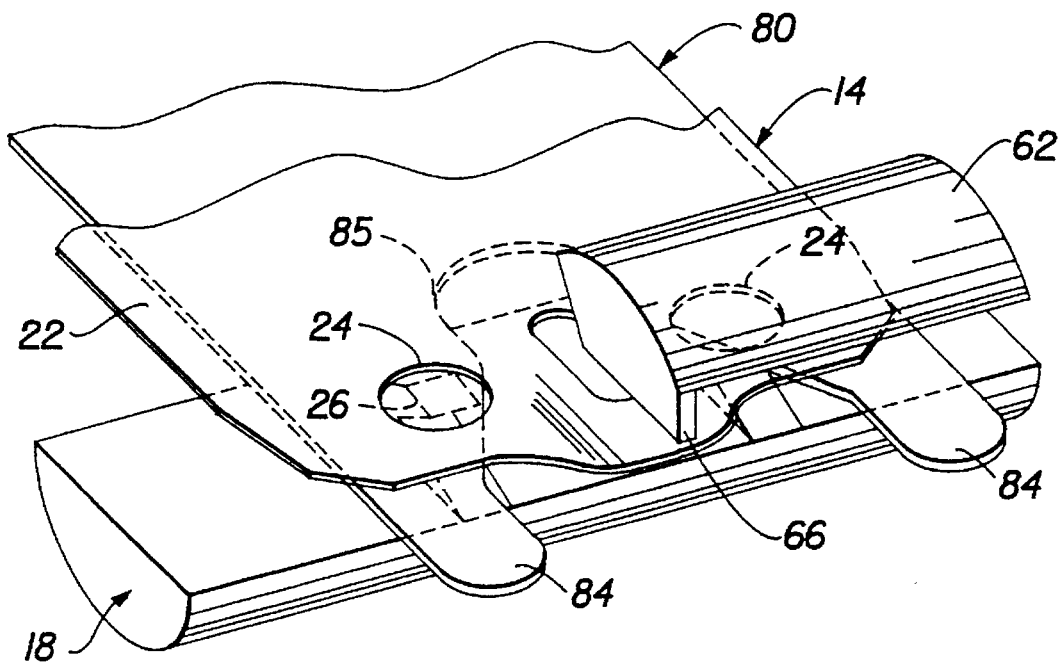
FIG. 11 is a perspective view of the front portion of the detach tool of FIG. 10 illustrating how the detach tool is used to remove the trailing end portion of a filmstrip from the spool of the film cartridge.
Figure 12:
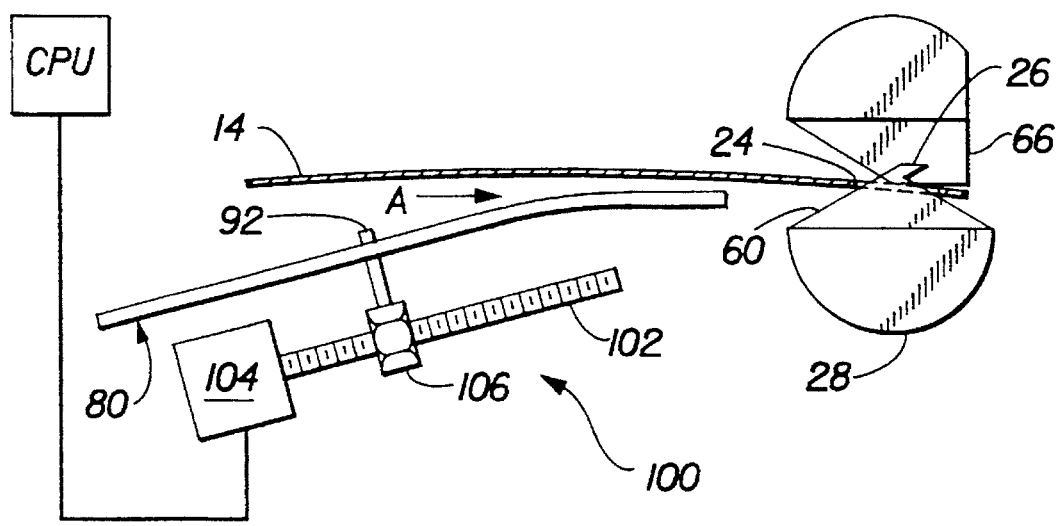
FIG. 12 is a schematic side view of the detach tool illustrating how the tool is used to disengage the trailing end of the filmstrip from the film cartridge.

As can be seen from FIG. 12, a drive mechanism 100 is provided within support block 101 for moving the detach tool 80 between the engaged position (as shown in FIG. 11)

and non-engaged position (as shown in FIG. 2). In the particular embodiment illustrated, drive mechanism 100 includes a lead screw 102, which is driven by a motor 104, which is controlled by a CPU or other control unit. A drive nut 106 is secured to lead screw 102 such that when motor 104 is activated in either direction, it will move the drive nut 106 appropriately along the axis of lead screw 102. The pin 92 which engages slot 90 is secured to drive nut 106 so as to move the tool 80 in the appropriate direction for engagement or disengagement with the spool 18.

In order to more clearly understand the operation of the detach tool 80, a brief discussion of its operation follows. Referring to FIG. 12, the filmstrip 14 is driven out of the cartridge 12 to a point where only about one wrap of the filmstrip 14 remains on spool 18. A detach perforation 108 in the filmstrip trailing end is sensed by a sensor (not shown), for example, a light-emitting diode and a charge coupler device. The sensor provides a signal to the spool drive stepper motor 111 which maintains the filmstrip 14 in position. Then the spool drive stepper motor 111 accurately positions spool 18 at a predetermined angular location with respect to the angle at which detach tool 80 will be inserted into the cartridge 12. Accurately positioning, the spool 18 serves two functions. First, spool 18 is positioned so that tool 80 can be inserted into the cartridge 12 for detachment of the filmstrip 14 from the spool 18. Second, rotation of the spool 18 by the stepper motor 111 while holding in place filmstrip 14 causes a small amount of slack to be imparted to the trailing end portion of the filmstrip 14. Providing of slack in the trailing end portion 22 of the filmstrip 14 facilitates removal of the trailing end portion 22 from the spool 18 by releasing the backside of openings 24 from the hooks 26. This approach to imparting slack in the filmstrip eliminates the need to reverse the direction of the filmstrip 14. As can be seen, the trailing end portion 22 of the filmstrip 14 is held on hooks 26 (projections). In order to insert tool 80 into slot 36, pin 92 is moved against end 90a of slot 90 (see FIG. 10). Motor 104 is properly activated for driving of tool 80 in the appropriate direction, thus causing the tool 80 to move along linear path 95 (which is below film path 83) toward the cartridge 12. The tool 80 is pushed against the bottom surface of the filmstrip trailing end portion 22 as the tool 80 is being inserted into the cartridge 12 such that the filmstrip trailing end portion 22 assists in guiding the tool 80 into the opening 36. The tool 80 is further inserted into spool 18 such that the second end portions 86 of the tool 80, respectively, slide up a pair of inclined surfaces 60 on spool 18. The tapering of the second end portions 86 provides reliable tool movement along the surfaces 60 and greatly reduces the chance that the openings 24 will get caught and damaged on the second portions of 86. As second portions 86 slide up inclined surfaces 60, first portions 84 of tool 80 engage the filmstrip trailing end portion 22 when fully inserted, tool 80 allows the filmstrip 14 to be detached. When the tool 80 has been fully inserted and the filmstrip totally disengaged, the motor 104 stops. After the filmstrip trailing end portion 22 has been removed from the spool 18, the motor 104 is rotated in the opposite direction so as to cause pin 92 to move away from the end 90a of the aperture to a position between end 90a and end 90b. Movement of the pin 92 to this position does not move the tool 80, but allows the tool 80 to be moved in a subsequent step. Appropriate controls (not shown) are provided so as to activate a motor (not shown) to rotate pinch rollers 33 to finally withdraw the filmstrip trailing end portion 22 from the spool 18 and cartridge 12 for delivering the film to a workstation wherein a work operation is performed on the filmstrip. The friction between the tool 80 and filmstrip 14 causes the tool 80 to move slightly during this operation. The motor 104 is activated so as to completely remove the tool 80 from the opening 36 of the cartridge thus freeing the cartridge 12 for reattachment of the filmstrip to the cartridge after the film has been subject to the desired photofinishing operation. The film feeds into path 83 by pinch rollers 33 for reattachment by reattachment tool 82.

Figure 9:
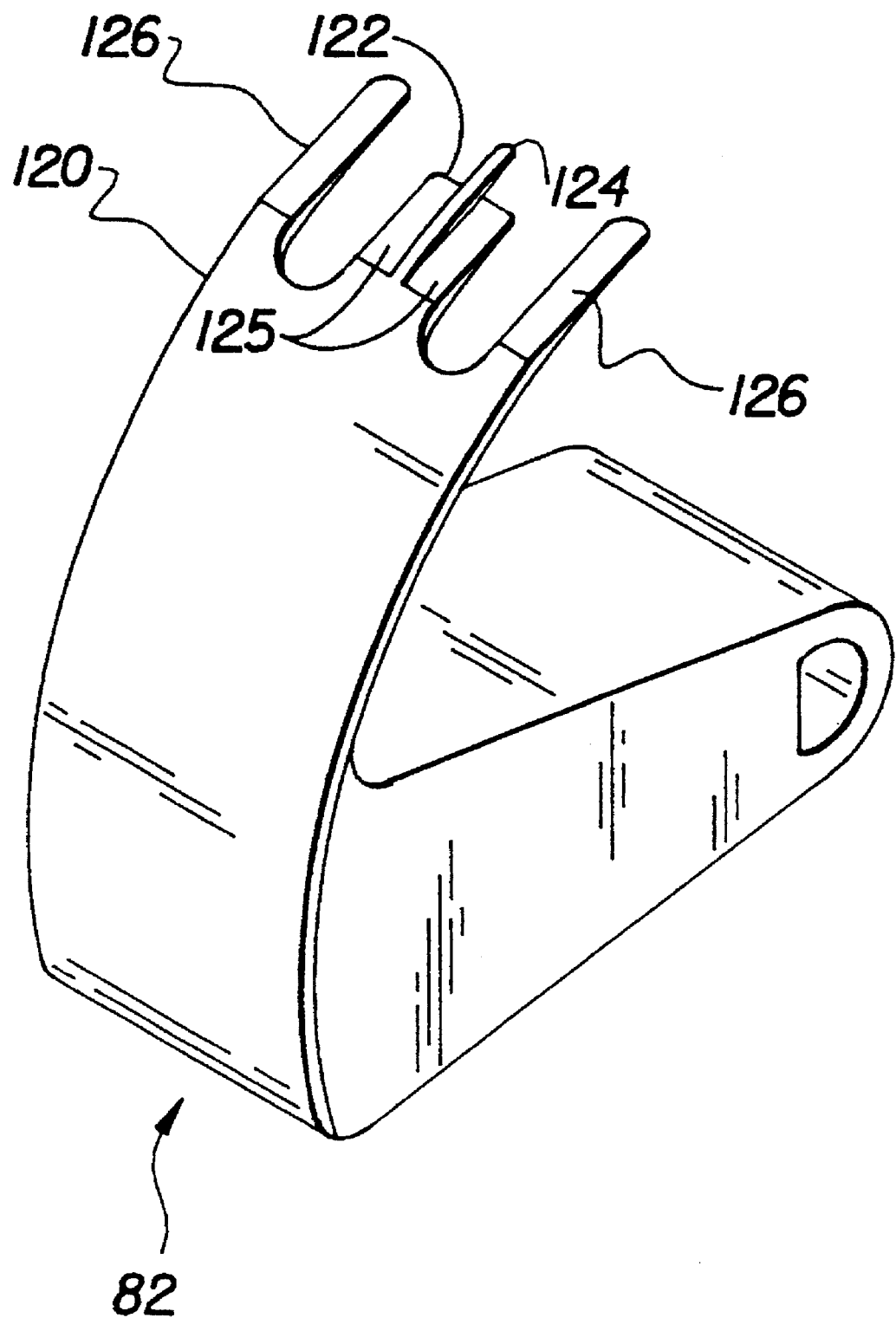
FIG. 9 is a perspective view of the reattach tool of FIG. 4.

Reattachment tool 82 is mounted to the support member 71 such that tool 82 pivots about point 114 below tool 80. The tool 82 includes a mounting section 116 having at its outer end an elongated arcuate blade 118 designed to be placed through the opening 36 in cartridge 12. As best seen by reference to FIG. 9, the blade 118 has a terminal end 120 which is used to move trailing end portion 22 of filmstrip 14 into cartridge 12 when it is desired to return the filmstrip 14 to the cartridge 12. In the embodiment illustrated, the terminal end 120 comprises a central engaging member 122 designed to engage drive opening 30 at the end of the filmstrip 14. Member 122 includes a retaining finger 124 which extends above and passing adjacent support surface 125. A pair of outer projecting members 126 are provided for supporting the lateral sides of the filmstrip 14. A more detailed discussion and description of the tool 82 may be found in copending application Ser. No. 09/172,006, filed Dec. 22, 1993, by Thomas C. Merle, Dale W. Ryan, and David L. Rowden, entitled TOOL FOR FILMSTRIP ATTACHMENT OR DETACHMENT, previously referred to, and which is hereby incorporated by reference.

Means are provided for moving tool 82 from the non-engaged position as illustrated in FIG. 2 to a first engaging position as illustrated in FIG. 4. In the particular embodiment illustrated, this may be accomplished by providing a drive shaft 130 which is secured to the lower end of the base section 116 of the tool 82. The drive shaft 130 is appropriately driven by a motor (not shown) for rotating the tool 82 along a substantially acruate path 117 to the positions required. For example, a stepper motor may be used for accurately positioning tool 82 in various positions during operation as described in the copending application Ser. No. 08/172,006, previously referred to. As can be seen, the tool path 117 for reattach tool 82 is below the film path 83 and the detach tool path 95. This allows the tools to be moved out of the way of each other when not in use and also allows the cartridge to be positioned at a single axial location for detach and reattachment of the filmstrip. Once the tool 82 has been positioned at its second engaging position as shown in FIG. 5, drive tool 51 is disengaged from contacting cartridge 12. At this point, second biasing means 134 biases the cartridge 12 in a second direction as illustrated by arrow 135. However, since the end 120 of the tool 82 has already been inserted in the opening 36, the tool 82 will restrict the cartridge 12 from any further rotational movement. Thus, the tool 82 orients the cartridge in the second engaging position. At this point, a filmstrip 14 is introduced so that it engages the end of the tool 82. The filmstrip is driven past the engaging members 122 and then is driven the opposite direction until the engaging members 122 engage the drive opening 30. At this point, the tool 82 is rotated until it engages the spool 18 so as to cause the trailing end portion 22 to reattach to the spool 18. Once the filmstrip 14 has been reattached to the spool 14, the tool 82 is rotated out of the cartridge 14 to the non-engaged position. Thereafter, the filmstrip 14 is rewound into the cartridge, allowing the cartridge to be removed and another cartridge positioned within the pocket 69.

Thus, the present invention provides an apparatus having a compact design for detaching and reattaching a filmstrip to a film cartridge whereby only a single film path is needed for removing or returning the strip to the cartridge. Additionally, there is no need to move the cartridge to a different workstation at a distant location, or providing unnecessary winding or unwinding of the filmstrip onto the cartridge.

It is to be understood that various other changes and modifications may be made without departing from the scope of the present invention. The present invention being defined by the claims that follow.

Parts List

10 . . . apparatus
12 . . . film cartridge
14 . . . filmstrip
16 . . . cartridge shell
18 . . . spool
22 . . . end portion
24 . . . openings
26 . . . projections
28 . . . hub
30 . . . drive opening
33 . . . pinch rollers
36 . . . opening/slot
38 . . . top edge
40 . . . bottom edge
42,44 . . . side edges
46 . . . light valve/door
48 . . . rotatable shaft
49 . . . ends
50 . . . side walls
51 . . . drive tool
52 . . . ledge section
54 . . . stop
56 . . . projection
60 . . . incline surface
62 . . . retaining members
64 . . . lateral ends
66 . . . contact members
69 . . . pocket
70 . . . mechanism
71 . . . support member
72 . . . hold down arm
73 . . . sides
74 . . . pivot
75 . . . step member
80 . . . detach tool
82 . . . reattach tool
83 . . . path
84 . . . leading first portions
85 . . . slot
86 . . . guide sections
88 . . . third portions
90 . . . aperture/slot
90a, 90b . . . ends
91 . . . guide members
92 . . . pin
93 . . . guide slot
95 . . . first tool path
100 . . . mechanism
101 . . . support member
102 . . . lead screw
104 . . . motor
106 . . . drive nut
108 . . . detach perforation
111 . . . stepper motor
114 . . . point
116 . . . mounting section
117 . . . acruate path
118 . . . blade
120 . . . terminal end
122 . . . central engaging member
124 . . . retaining finger
125 . . . support surface
126 . . . outer projecting members
130 . . . drive shaft
134 . . . second biasing means
135 . . . arrow

We claim:

1. A mechanism for detaching and reattaching a filmstrip from a film cartridge having a spool rotatably mounted therein around which is wound the filmstrip and an opening through which the filmstrip may pass for allowing the filmstrip to be removed from or returned to a film cartridge, said filmstrip having a leading edge and a trailing edge, said trailing edge of the filmstrip being detachably secured to the spool, said mechanism comprising:

holding means for holding said cartridge in a predetermined axial position;

a guide for providing a single film guide path along which the filmstrip is guided when said filmstrip is being removed from or being returned to the film cartridge;

a detach tool movable along a first tool path such that said tool can be inserted into said film cartridge such that the trailing edge of the filmstrip may be detached from the spool; and a reattach tool movable along a second tool path different from said first tool path so as to allow the tool to engage the trailing edge of a filmstrip being returned to said film cartridge along said guide path, said detach tool, reattach tool, and said guide being in axial alignment with respect to said filmstrip disposed in said cartridge at said predetermined axial position.

2. A mechanism according to claim 1, wherein said first path of said detach tool is located below said guide path such that the tool will engage the bottom surface of the filmstrip.

3. A mechanism according to claim 1, wherein said reattach tool is located at the position below said guide path such that said reattach tool will be adjacent the bottom side of said filmstrip.

4. A mechanism according to claim 1, wherein when second tool path of said reattach tool forms a substantially arcuate path.

5. A mechanism according to claim 1, wherein said guide comprises a pair of lateral guide members.

6. A mechanism according to claim 1, further comprising means for allowing said film cartridge to rotate about the axis of said spool so as to make it easier for reattachment of the filmstrip to the spool.

7. A mechanism for detaching and reattaching a filmstrip from a film cartridge having a spool rotatably mounted therein around which is wound the filmstrip and an opening through which the filmstrip may pass for allowing the filmstrip to be removed from or returned to a film cartridge, said filmstrip having a leading edge and a trailing edge, said trailing edge of the filmstrip being detachably secured to the spool, said mechanism comprising:

holding means for holding said cartridge in a predetermined axial position;

a guide for providing a single film guide path along which the filmstrip is guided when said filmstrip is being removed from or being returned to the film cartridge;

a detach tool movable along a first tool path such that said tool can be inserted into said film cartridge such that the trailing edge of the filmstrip may be detached from the spool; and a reattach tool movable along a second tool path different from said first tool path so as to allow the tool to engage the trailing edge of a filmstrip being returned to said film cartridge along said guide path, said detach tool, reattach tool, and said guide being in axial alignment with respect to said filmstrip disposed in said cartridge at said predetermined axial position, said second tool path being an acruate disposed below said first tool path.

8. A mechanism according to claim 7, wherein said first path of said detach tool is located below said guide path such that the tool will engage the bottom surface of the filmstrip.

9. A method for attaching and detaching a filmstrip from a film cartridge along a single film path, comprising the steps of:

providing a detach tool for detaching the trailing end portion of said filmstrip from said cartridge, moving said tool along a first tool path below said film path for detaching said trailing end portion, providing a reattach tool for reattaching the trailing end portion to said film cartridge, moving said reattach tool along a second tool path different from said first tool path for reattaching the trailing end portion to said cartridge.

10. A method according to claim 9, wherein said detach tool is moved in a substantially linear direction.

11. A method according to claim 9, wherein said reattach tool is moved in a substantially arcuate direction.

* * * * *